March 17, 1959 F. A. KANE, JR., ET AL 2,877,997
DEVICE FOR CONTROLLING THE ADMISSION OF
FUEL INTO INTERNAL COMBUSTION ENGINES
Filed July 11, 1955 5 Sheets-Sheet 1
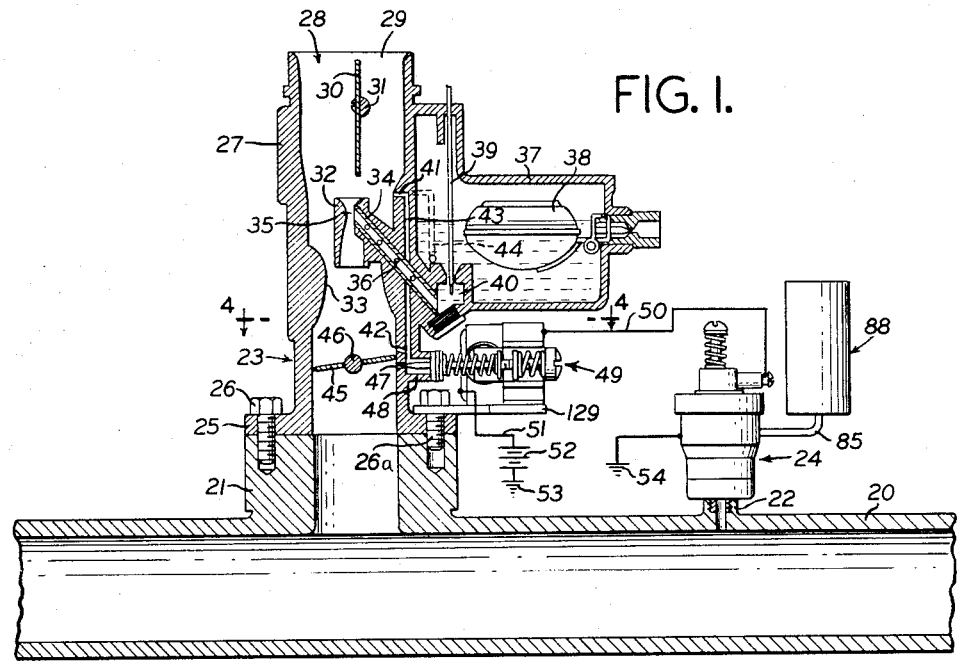
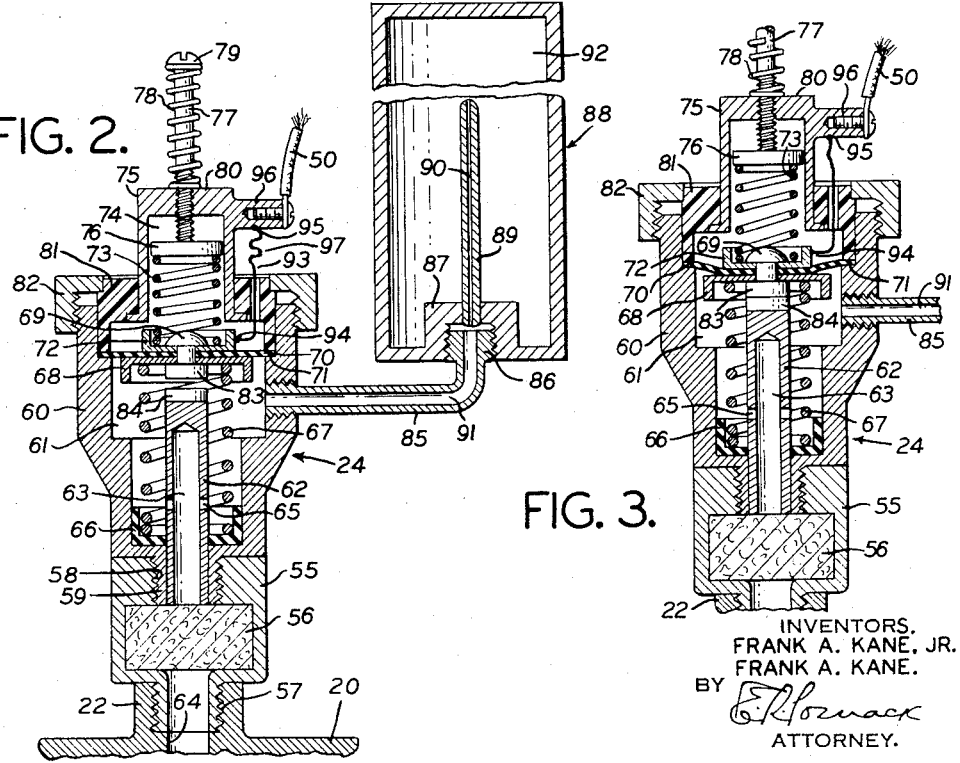
INVENTORS.
FRANK A. KANE, JR.
FRANK A. KANE.
BY
ATTORNEY.

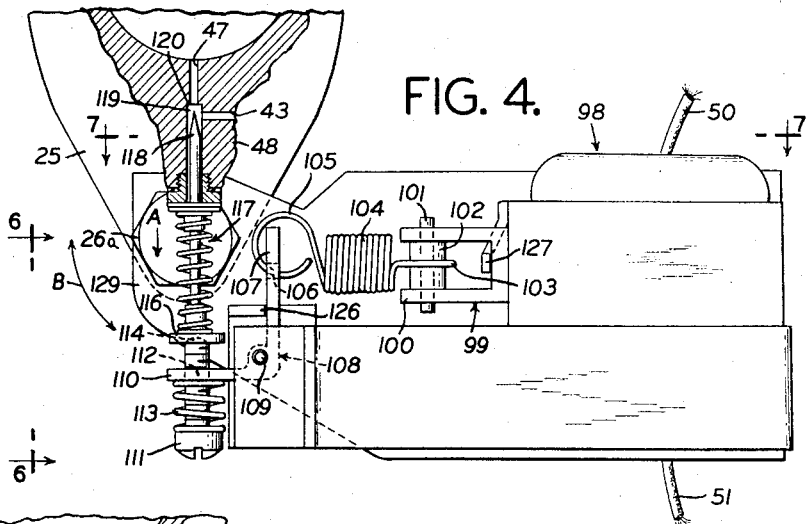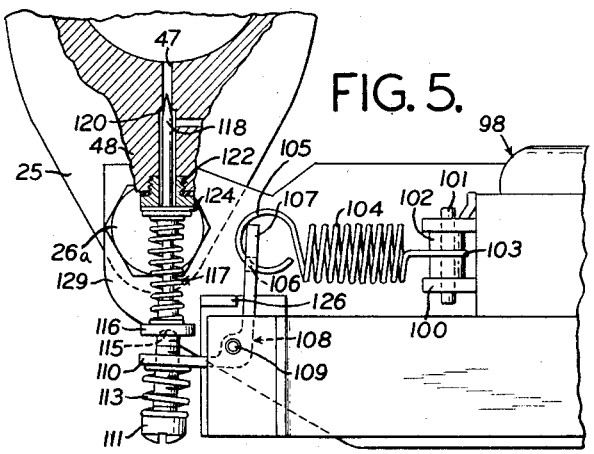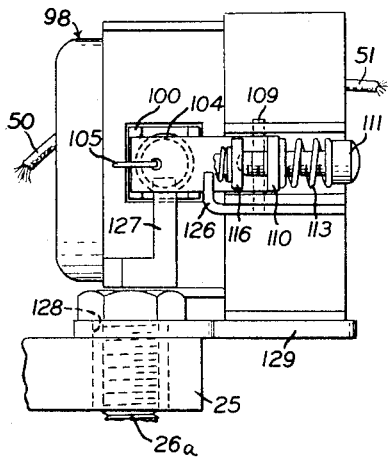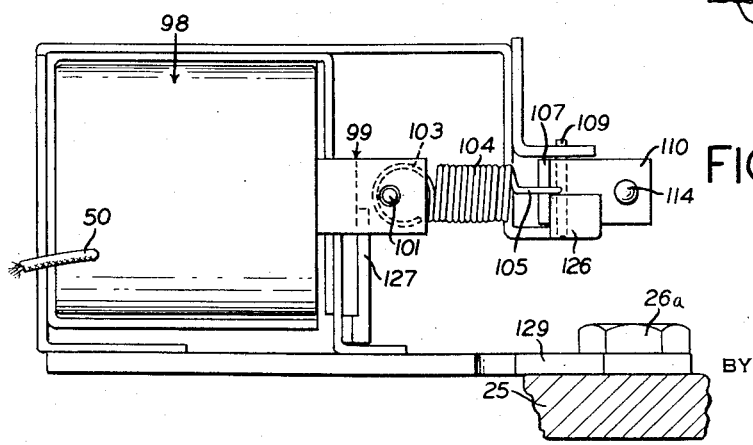

March 17, 1959 F. A. KANE, JR., ET AL 2,877,997
DEVICE FOR CONTROLLING THE ADMISSION OF
FUEL INTO INTERNAL COMBUSTION ENGINES
Filed July 11, 1955 5 Sheets-Sheet 3

INVENTORS.
FRANK A. KANE, JR.
FRANK A. KANE.
BY
ATTORNEY.

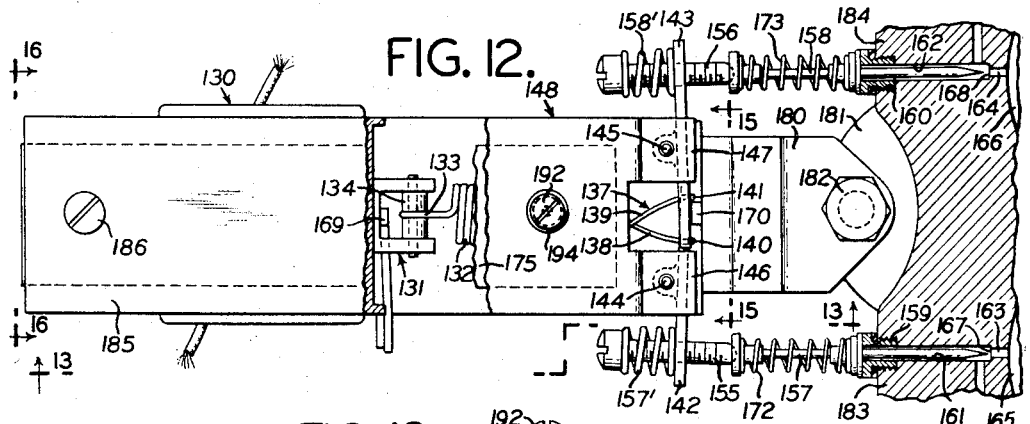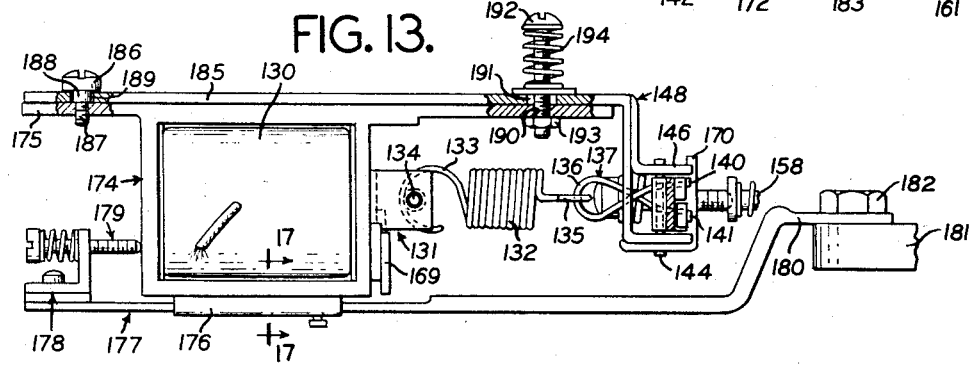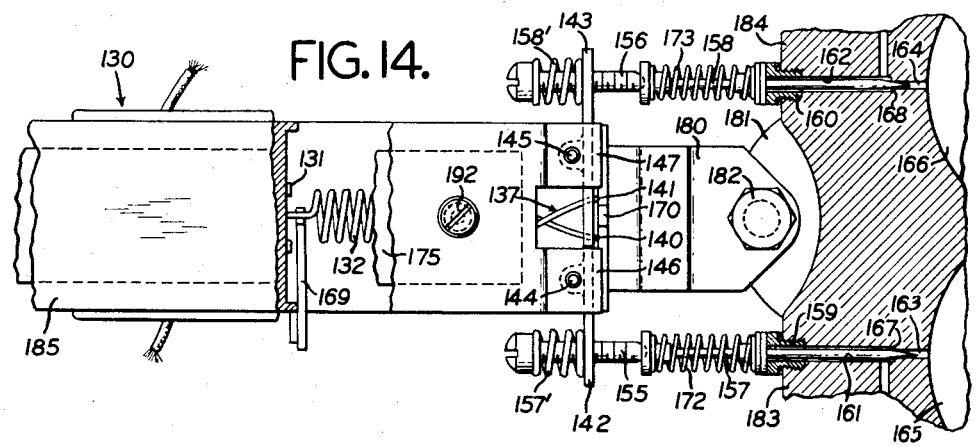

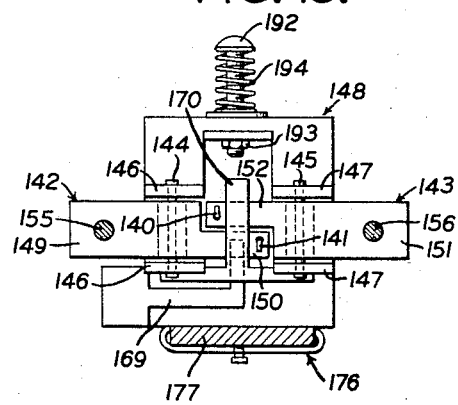
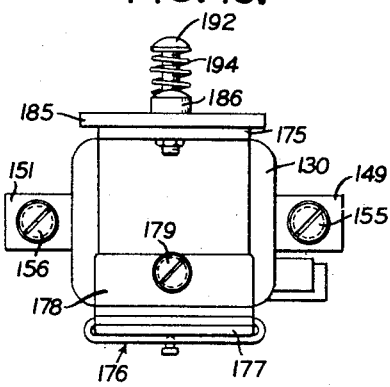
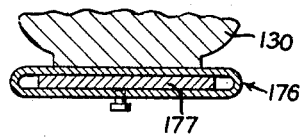
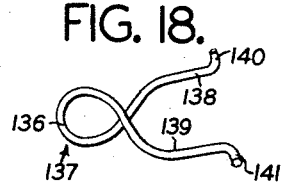
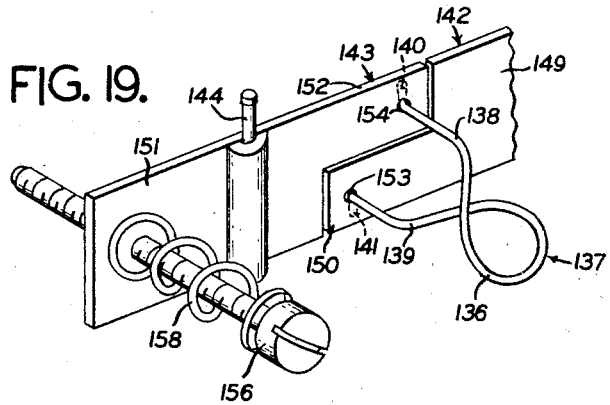

United States Patent Office 2,877,997
Patented Mar. 17, 1959

2,877,997

DEVICE FOR CONTROLLING THE ADMISSION OF FUEL INTO INTERNAL COMBUSTION ENGINES

Frank A. Kane, Jr., Stratford, and Frank A. Kane, Derby, Conn., assignors of one-fourth to Girard F. Oberrender and one-fourth to Emanuel R. Posnack, New York, N. Y.

Application July 11, 1955, Serial No. 521,225

14 Claims. (Cl. 261—41)

This invention relates to fuel control devices for internal combustion engines, and is particularly directed to a device for discontinuing the flow of fuel from a carburetor to the intake manifold during deceleration, and reestablishing the flow after the deceleration cycle.

It is known that with conventional carburetion there is an inefficient utilization of fuel during the deceleration cycle, especially because, with the increase in the intake manifold vacuum occurring during said cycle, relatively rich gas is pulled into the engine. This results not only in a waste of fuel, but also in the presence of unburnt or partially burnt fuel gases in the exhaust of the engine, since all such gas cannot be consumed with the reduced amount of air used during deceleration. It is also known that such unburnt exhaust gases constitute a contributing factor to smog conditions prevailing in many areas where there are large numbers of cars in continuous use.

Heretofore attempts to control the amount of fuel introduced into the engine during deceleration have not been successful in practice—in some instances because of inadequate and misplaced means employed for such control (such as the indirect method of reducing intake manifold vacuums by the bleeding thereof), and in other instances because the reestablishment of the fuel flow could not be readily effected, resulting in the stalling of the engine.

It is primarily within the contemplation of this invention to solve the deceleration problem by effective controls during and after deceleration, so as to effect both a positive cutting off of fuel, and a quick recovery thereafter for maintaining uninterrupted engine operation. And in this aspect of our invention it is our objective to effect the said control at the idling jet, and without interfering with the operation of other fuel jets or orifices.

It is a further object of our invention to provide a deceleration control device capable of being adjusted to various internal combustion engine conditions, and of being operably responsive to intake manifold pressures within a predetermined range.

It is also within our contemplation to enable the device of this invention to be incorporated into conventional carburetors, without material alteration and with a minimum of effort. And in this aspect of our invention it is a further object to enable the device to be adjusted to different carburetor constructions, proportions and dimensional tolerances.

Another object of this invention is to enable it to be adapted for use with single and dual carburetor constructions, and motor vehicles of both conventional and fluid or other types of automatic drives.

It is within our contemplation to provide a readily fabricated and comparatively inexpensive device having the advantages and features hereinabove set forth.

Other objects, features and advantages will appear from the drawings and the description hereinafter given.

Referring to the drawings,

Fig. 1 is a fragmentary sectional elevation of an intake manifold and carburetor assembly, showing in elevation one form of our invention operatively in place, certain portions being illustrated schematically for clarity, the device being shown in its fuel shut-off or closed position.

Fig. 2 is an axial section of the intake manifold vacuum-controlled electrical switch illustrated in Fig. 1, a fragment of the intake manifold being shown, the device being illustrated in its open or inoperative position.

Fig. 3 is a fragmentary view of Fig. 4, showing the device in its circuit-closing or operative position.

Fig. 4 is a fragmentary plan view partially in section, of the solenoid and needle valve assembly component of our invention, the view being taken substantially in the direction of arrows 4—4 of Fig. 1, the device being shown with the idling orifice valve in its open position.

Fig. 5 is a fragmentary view like Fig. 4, but showing the idling valve and associated parts in their closed or fuel cut-off position.

Fig. 6 is an end view of the device of Fig. 4, shown substantially looking in the direction of arrows 6—6, a fragment of the needle valve assembly being removed for clarity.

Fig. 7 is a part elevational, part sectional view of Fig. 4, looking in the direction of arrows 7—7, the needle valve assembly being removed for clarity.

Fig. 12 is a plan view, partly in section, of a form of our invention as applied to a dual carburetor construction, fragments being removed for clarity, the needle valve members being shown in their open positions.

Fig. 13 is an elevational view, partly in section, of Fig. 12, looking in the direction of arrows 13—13, fragments of the needle valve assembly being removed for clarity.

Fig. 14 is a view substantially like Fig. 12, but showing the needle valves in their operatively closed positions.

Fig. 15 is a fragmentary section of Fig. 12 taken substantially along line 15—15.

Fig. 16 is an end view of Fig. 12 looking substantially in the direction of arrows 16—16.

Fig. 17 is a somewhat enlarged fragmentary section of Fig. 13 taken along lines 17—17.

Fig. 18 is a perspective view of the lever connector member of the structure of Fig. 12.

Fig. 19 is a fragmentary perspective view of the two trip levers illustrated in the structure of Fig. 12, with the connector of Fig. 18 in place, and showing one needle valve adjusting screw member in place.

Figure 8:
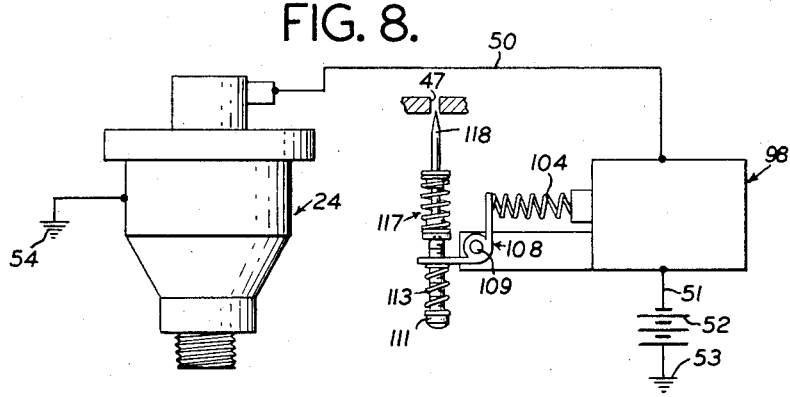
Fig. 8 is a schematic view of the main components of our invention, and a wiring diagram showing the electrical connection therefor.

In the form of our invention illustrated in Figs. 1–8, the intake manifold 20 contains the bosses 21 and 22, the former having mounted thereon the carburetor generally designated 23, and the latter having mounted thereon the intake manifold vacuum-controlled electrical switch generally designated 24. In the particular embodiment illustrated, the flange 25 of carburetor 23 is mounted on said boss 21 and secured thereto with studs 26 and 26a. Said carburetor, which for the purposes of this specification is semi-schematically illustrated, comprises a casing 27 through which extends the fuel mixture passageway 28, the upper portion 29 of which constitutes the air entrance and contains the conventional choke valve 30, pivotally mounted at 31. Below said choke valve 30 is the venturi nozzle 32 communicating with the restricted throat 33 therebelow of passageway 28. Extending into said venturi 32 is the perforated tube 34, the discharge terminal of which is disposed substantially in throat 35 of said venturi 32—the perforations 36 of said tube 34 communicating with the air chamber of the carburetor float chamber 37 in a manner not illustrated but well known to those skilled in the art. Said float chamber 37 contains therein the float 38, valve member 39, fuel compartment 40 and other conventional components that are herein not described and only schematically represented, since a detailed description thereof is not necessary for the purpose of this specification. Communicating with passageway 28 are the low speed orifices 41, 42 and 47, these communicating with each other through channel 43, and communicating through channel 44 with the float bowl 37 in a manner well known to those skilled in the art. For the purpose of this specification, the orifice 42 will be referred to as the bypass orifice or jet, this being located adjacent the throttle valve 45, rotatably mounted at 46, in said passageway 28.

In adjacent spaced relation to bypass orifice 42 is said idling orifice 47—the arrangement being such that when throttle 45 is in the closed position illustrated in Fig. 1, said valve is flanked by said low-speed orifices 42 and 47—bypass orifice 42 being on the air side of the valve and idling orifice 47 being on the intake manifold side of said valve.

Mounted on the boss 48 of the casing 27 and on a portion of said flange 25 of the carburetor is the idling valve-solenoid assembly generally designated 49. This is electrically connected by conductor 50 to said vacuum switch 24, the solenoid of assembly 49 being electrically connected by conductor 51 to battery 52—ground connections 53 and 54 completing the electrical circuit.

The arrangement is such, as will hereinafter be set forth in detail, that the idling orifice 47 is normally kept open in accordance with predetermined best idling conditions. When the vacuum in the intake manifold 20 exceeds a certain predetermined value—such as 21" of mercury—the switch 24 is closed, whereby the solenoid of the assembly 49 is energized to close the low-speed or idling orifice 47. It should be noted that the manifold vacuum is increased when the throttle 45 is being closed during deceleration, said vacuum being restored to predetermined normal values when the throttle 45 is opened after the deceleration cycle. It is when the vacuum in the intake manifold is returned to a certain predetermined range of values that the switch 24 is operatively opened, thereby deenergizing the solenoid of assembly 49, whereupon the idling orifice 47 is again opened. It is an important aspect of this invention, as will hereinafter appear, that although the idling orifice 47 is instantly closed upon deceleration, there is a slight lag of predetermined duration, upon the ending of the deceleration cycle, before the switch 24 is operatively opened, thereby eliminating flutter and rendering the device not over-critical, nevertheless establishing quick recovery to prevent stalling.

The intake manifold vacuum-controlled electrical switch 24 is, in the form illustrated in Figs. 2 and 3, mounted upon the fitting 55, containing therein a filter 56—such as of spun glass—to keep the mechanism within member 24 free of impurities that may be present in the intake manifold 20. Said fitting 55 contains the threaded extension 57 which is threaded into the said boss 22 of the intake manifold, the upper threaded passageway 58 of fitting 55 receiving therein the threaded boss 59 of the said switch member 24.

In the form illustrated, the said switch member 24 comprises a casing 60 within which is the chamber 61. Extending from said boss 59 upwardly into said chamber 61 is the hollow tube 62, the interior 63 thereof communicating through the filter 51 with the interior 64 of the intake manifold, and through the preferably restricted apertures 65 with the said chamber 61 of casing 60. At the base of chamber 61 is the insulating cup 66, supporting the main helical spring 67 surrounding said tube 62—the upper portion of said spring being in abutment with the metallic receptacle 68 attached by the rivet 69 to the insulating diaphragm 70, the latter being supported by the annular seat 71 along the inner wall of casing 60.

Disposed upon the upper surface of diaphragm 70 is the metallic receptacle 72 supporting the auxiliary spring 73, the latter being positioned within the compartment 74 within the upper casing 75—the upper portion of said auxiliary spring 73 carrying the disc 76. In abutment with the upper surface of said disc is the adjusting screw 77 extending through and being in threaded engagement with the hole 78 at the top of said upper casing 75—the spring 78 disposed between head 79 of said screw and the top surface 80 of casing 75 serving to hold said screw 77 in its adjusted position. Enveloping said casing 75 is the insulating gasket 81—the screw cap 82, in engagement with the upper threaded portion of casing 60, enveloping and keeping said gasket 81 in compressed condition so as to provide an air-tight seal for said chamber 61.

The said rivet 69 also supports the upper contact member 83, the lower contact member 84 being supported by the top of said tube 62.

Tapped into the wall of casing 60 is the rigid tube 85, the opposite terminal portion 86 of said tube being enlarged and being in threaded engagement with the internal boss 87 of the bleeder tank generally designated 88. Secured to and extending upwardly within said tank 88 is the pipe 89 with restricted passageway 90 therein. The arrangement is such that there is direct communication between said chamber 61, the passageway 91 of tube 85, the passageway 90 of pipe 89, and the interior 92 of tank 88.

In the form illustrated, an electrical conductor 93 (schematically illustrated) is electrically connected at 94 to the receptacle 72, which in turn is electrically connected to said contact member 83, and the said conductor 93 has its opposite end 95 attached to the boss 96 which serves as an electrical terminal for the said conductor 50. It will be noted that the said conductor 93 contains convolutions 97 to provide a slack portion and thereby to permit an extension of conductor 93 when the diaphragm 70 is operatively deflected downwardly in a manner to be hereinafter explained. It is to be understood that the method of creating a slack portion such as 97 in conductor 93 is not limited to the specific construction illustrated, since other methods known to those skilled in the art may be employed with like force and effect. As aforesaid, the said conductor 50 is connected to the solenoid of assembly 49; and in the form illustrated, the casing 60 is joined and electrically connected to the intake manifold 20, and is thus electrically grounded.

In presetting the mechanism 24, it is first required to determine the idling vacuum within intake manifold 20; and based upon such value, the specific spring pressure acting upon diaphragm 70 is adjusted. It will be noted that main spring 67 urges the diaphragm 70 upwardly against the downward pull exerted by the suction in the intake manifold. The auxiliary spring 73 can be adjusted, through screw 79 acting upon disc 76, so that it will exert a counterforce on the diaphragm 70, the magnitude of the counterforce depending upon the compression of said spring 73 as effectuated by the operative manipulation of adjusting screw 77. In this manner, a predetermined effective force can be produced by main spring 67, whereby the diaphragm 70 will be pulled downwardly, against the action of this spring, by a predetermined vacuum within the intake manifold. If, for example, the predetermined vacuum is 21" of mercury, any greater suction will be effective in deflecting the diaphragm 70 downwardly against the action of the said effective force of spring 67. Upon such deflection, as appears from Fig. 3, the contacts 83 and 84 will be brought into engagement, thereby to close the circuit through conductor 50 and its associated parts.

As aforesaid, when this circuit is closed, the idling orifice 47 is closed (through a movement of parts to be hereinafter explained), thereby shutting off the flow of fuel through said idling orifice. Inasmuch as the throttle 45 is closed when this occurs, there is no fuel flowing into the intake manifold, whereupon the increase in deceleration suction is arrested, and the pressure in the manifold correspondingly increased. Since the manifold is in communication with the chamber 61, the pressure within said chamber will also return to that prevailing in the intake manifold; and when that pressure reaches a sufficient magnitude, the effective pressure exerted by the main spring 67 will cause the diaphragm 70 to return to its circuit-opening position shown in Fig. 2—thereby enabling the idling orifice 47 to be opened.

When the vacuum in the intake manifold increases during deceleration, as aforesaid, there is a corresponding decrease in the pressure (increase in vacuum) in chamber 61; and since this chamber is in communication with the interior 92 of bleeder tank 88, the pressure therein will also gradually decrease. However, since the chamber 61 is closer to the intake manifold than is the interior of tank 88, and since the passageway 90 of pipe 89 is of restricted proportions, it is evident that there will be a delayed equalization of pressures between chamber 61 and interior 92 of the bleeder. Accordingly, as soon as the normal idling vacuum in the intake manifold is increased to said predetermined value by the deceleration effect, the diaphrgam 70 will be deflected and the contacts 83 and 84 brought into immediate engagement, to produce an instantaneous closing of the idling orifice 47. However, while the deceleration cycle is approaching its end and the pressure in the manifold is returning to normal idling values, the bleeder tank 88 serves to create a lag in the separation of the contacts. In other words, when the air from intake manifold begins to return through apertures 65 to the previously evacuated chamber 61, it will also slowly return to the bleeder tank 88— this bleeding effect into the tank retarding the build-up of the pressure within chamber 61. Accordingly, the engaged contacts 83 and 84 will not be separated while the normal idling vacuum is being approached within the intake manifold, such separation occurring only when complete equalization has been attained between the pressure within chamber 61, the intake manifold and the bleeder tank, whereby the downward pull on the diaphragm 70 is released and the spring 67 permitted to urge the upper contact 83 away from the lower contact 84. The arrangement is hence thus such that the pressure within the intake manifold is permitted to increase over a short range of values before the contacts 83 and 84 are separated. This eliminates the possibility of an oversensitive make-and-break action of contacts 83 and 84, and also obviates any undesirable flutter of the needle valve associated with the idling orifice 47.

By referring to Figs. 4-7, it will be seen that the conductor 50 is operatively connected to a solenoid generally designated 98, said solenoid being of conventional construction with a plunger member, generally designated 99, arranged to be drawn inwardly from the position of Fig. 4 to that of Fig. 5 upon an operative energization of the solenoid by a closing of the aforesaid contacts 83 and 84. Said plunger, in the form illustrated, contains a bifurcated terminal 100 supporting the transverse pin 101 within the insulating tube 102 over which is anchored the loop 103 of solenoid spring 104—the opposite loop 105 of said spring being interlooped with the aperture 106 in the arm 107 of the trip lever generally designated 108. Said lever is pivotally mounted at 109, the other arm 110 of the lever carrying the needle valve adjusting screw 111. In the form illustrated, the shank of said screw 111 is in threaded engagement with the apertured portion 112 of said arm 110, there being a spring 113 between arm 110 and the head of screw 111 to maintain the screw in its adjusted position.

Figure 10:
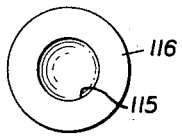
Fig. 10 is a top view of Fig. 9.

The terminal 114 of said screw 111 is rounded, being preferably semi-spherical, and is in engagement with the semi-spherical depression 115 (see Fig. 10) in the head 116 of the needle valve generally designated 117. The shank 118 of said needle valve is proportioned to extend into the carburetor channel 119 communicating with the said idling orifice 47 (see Fig. 4). The tapered terminal portion of needle valve shank 118 is adapted to engage the idling valve seat 120 when it is operatively projected into its closed position illustrated in Fig. 5, thereby closing said idling orifice 47.

Figure 9:
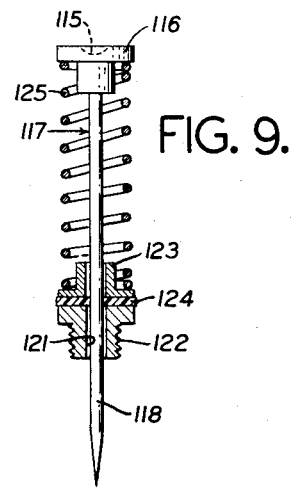
Fig. 9 is a part sectional, part elevational view of the needle valve assembly of our invention, shown with guide bushings and spring.

The said shank 118 of the needle valve 117 slidably moves through the central aperture 121 of the guide bushing 122, the latter being in engagement with said boss 48 of the carburetor (see Figs. 1, 4, 9). The needle valve shank 118 also slidably extends through the sealed bushing 123, a gasket 124 serving as a seal to prevent the leakage of gas therepast. A spring 125 is mounted over shank 118 between said valve head 116 and the bushing 123, and exerts pressure in the direction of arrow A (Fig. 4), whereby the needle valve 117 is normally urged by said spring into its open position.

The said needle valve 117 is operatively movable between its projected closing position shown in Fig. 5 and its open position shown in Fig. 4. The said open position is determined by said adjusting screw 111, since said screw can be projected forwardly or retracted rearwardly, against the action of spring 113, to fix the rearmost retracted position of the said needle valve. The position of screw 111 is determined by the retracted position of the lever 108, such position (as shown in Fig. 4) being determined by the stop member 126 against which arm 107 of the lever is abuttable. The outer or inoperative position of the solenoid plunger 99 is also limited to a predetermined position—that determined by the stop member 127, as shown in Figs. 4 and 7.

The spring 104 is of such proportions and is so positioned that when the valve is in its open position illustrated in Fig. 4 and the solenoid 99 is in its outer inoperative position, the spring will not be under tension; and when the valve 117 is in its closed position shown in Fig. 5 and the plunger 99 is drawn into the solenoid due to the latter's energization, the loop 105 will be instantly brought into contact with arm 107 and the spring 104 elongated, as illustrated in Fig. 5.

The arrangement is hence such that there is no undesirable looseness or lag between the components of the solenoid-needle valve assembly, and the positions of the respective movable components are such as to cause instantaneous response to the energization and deenergization of the solenoid. The spring arrangement permits firm yet yieldable engagement of the needle valve 117 with the seat 120 to effectively close the idling orifice, and yet permits of an instantaneous retraction of said needle valve when the solenoid is deenergized.

The structure is also such that the needle valve-adjusting screw assembly is at all times in proper alignment with respect to the idling orifice for effective operation. The operative movement of the lever 108 is necessarily such, in this form of our invention, that the position of the shank of screw 111 is shifted with respect to the shank of the needle valve 117—as is apparent by comparing relative positions of these parts in Figs. 4 and 5. Yet, because of the above-described arrangement of parts, and the rotatable engagement of the rounded tip 114 of screw 111 with the semi-spherical depression 115 in the needle valve head 116, there is always an effective engagement between said screw 111 and the needle valve 117, even when the shank of said screw is in angular relation to that of said valve.

It is further to be noted that the entire assembly 49 of the solenoid and needle valve is adjustably mounted on the carburetor. The mounting is effected through stud 26a which extends through aperture 128 of the plate 129 (Fig. 6) carrying the solenoid structure 98 (see also Figs.

2, 4, 5, 7). Said plate is in effect pivotally mounted on flange 25 and can be swung in the direction of arrows B (Fig. 4), to obtain a proper alignment of the needle valve assembly with respect to the needle valve channel 119 and idling orifice 47.

It is thus evident that this device can readily be made an integral part of a carburetor, or added to a conventional carburetor. Instead of the conventional idling adjusting screw, normally applied to boss 48 in conventional carburetion attachments, the guide bushing 122 (Figs. 5 and 9) and associated parts are employed, the rest of the assembly being as above described.

From the above description, it is apparent that upon deceleration, through the closing of throttle 45, the intake manifold vacuum-controlled electrical switch 24 is instantly closed, whereupon needle valve 117 is instantly projected into its closed position, thereby preventing any fuel from flowing through the idling orifice 47 into the intake manifold. As aforesaid, since the throttle 45 is closed, no fuel from the by-pass jet 42 can be introduced into the intake manifold. Accordingly, the losses usually occurring during deceleration are eliminated—resulting not only in considerable fuel saving (because of the many deceleration operations during the course of motor car driving) but also reducing to a minimum, if not entirely, the unburnt gases in the exhaust which contribute to smog conditions.

When the throttle 45 is opened after the deceleration cycle, the intake manifold vacuum is reduced, causing the opening of the idling orifice 47, as aforesaid. Inasmuch as the by-pass jet 42 is also exposed to the passageway leading to the intake manifold when the throttle 45 is opened, there will be an immediate reestablishment of fuel flow through both the idling orifice 47 and said by-pass jet 42; and at the same time the air and gas mixture from the nozzle 32 is permitted to enter the intake manifold. There is thus effected a positive return to normal conditions, whether idling or accelerating, without the danger of stalling.

Figure 11:
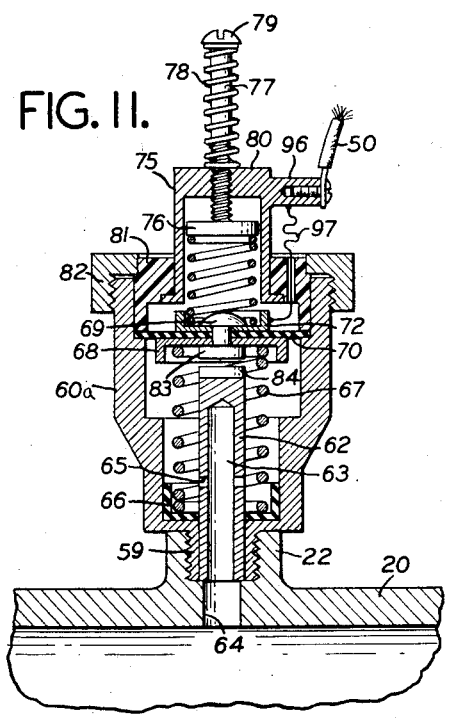
Fig. 11 is an axial section of a modified form of intake manifold vacuum-controlled electrical switch, a fragment of the intake manifold being shown, the device being illustrated in its open-circuit or inoperative position.

Although the preferred form above described employs a filter 56 and a bleeder tank 88, this invention is operable under certain conditions without these components. Such a device is illustrated in Fig. 11 in which the casing 60a is directly mounted on the boss 22 of intake manifold 20, there being no bleeder tank such as 88 shown in Fig. 2. In all other essentials the structure of Fig. 11 is like that of the form first above-described.

This invention is also applicable to dual carburetor constructions, as illustrated in Figs. 12–19. The vacuum switch employed therewith, not shown, is of the type above described, like that illustrated in Fig. 2, it being electrically connected to a solenoid 130 which is substantially like that of the form first above described. The solenoid has a plunger 131 which is operatively movable from the outer inoperative position of Figs. 12 and 13 to the inner operative position of Fig. 14. Said plunger 131 has anchored thereto, substantially in the manner aforesaid, a spring 132, the loop 133 thereof engaging the insulated pin member 134, the opposite loop 135 being interengaged with the loop 136 of the connector member 137. As will be observed from Fig. 18, said connector member has legs 138 and 139 extending in intersecting relation from loop 136, said legs having oppositely extending terminals 140 and 141. The said two legs extend through two holes in the two pivotally mounted levers 142 and 143, so that when the plunger 131 is operatively drawn in, the pull exerted on connector 137 will cause both of said levers 142 and 143 to be simultaneously pivotally actuated.

In the specific form illustrated, the said levers 142 and 143 are pivotally mounted on their respective pivot pins 144 and 145, supported on the respective pairs of horizontal flanges 146 and 147, constituting a part of the framework generally designated 148 (Figs. 13 and 15). Lever 142 contains the arm 149 and the relatively narrow opposite arm 150; and 143 contains the arm 151 and the relatively narrow arm 152. The arrangement is such that the said narrow arms 150 and 152 are in overlapping relation, arm 150 having therein the aperture 153 and arm 152 having therein aperture 154. The connector 138 is so attached to said levers, as will appear from Fig. 19, that said terminal portion 140 extends through aperture 154, and the terminal portion 141 extends through the aperture 153. In threaded engagement with the oppositely positioned arms 149 and 151 of the respective levers 142 and 143 are the respective needle valve adjustment screws 155 and 156, with the respective springs 157′ and 158′ on the shank thereof. Each of these adjustment screws is operatively engageable, substantially in the manner of the form first above described, with the respective heads of the needle valves 157 and 158, the shanks of said needle valves slidable extending through the respective guide bushings 159 and 160 into the respective needle valve channels 161 and 162, these channels communicating with the respective idling orifices 163 and 164 communicating with the carburetor ducts 165 and 166, each of the latter corresponding to the passageway 28 of Fig. 1 leading into the intake manifold (not shown). The structures of the bushings and sealing members are like those illustrated in Figs. 9 and 10, and a description thereof will not accordingly be herein repeated. The tapered terminals of each of said needle valves 157 and 158 are operatively engageable with the respective seats 167 and 168 of the channels 161 and 162, to effect a closing of the said idling orifices 163 and 164.

When the solenoid 130 is energized and the plunger 131 is retracted, the operative pivotal movement of said levers 142 and 143 will cause the said needle valves 157 and 158 to engage the seats 167 and 168, and accordingly shut off the fuel supply through the respective idling orifices; and when the solenoid is deenergized, the plunger 131 will return to its inoperative position shown in Figs. 12 and 13, the limit of such movement being determined by a stop 169 which is in engagement with the plunger, as illustrated. There is also another stop member 170 (see Fig. 15) which engages both of the narrow arms 150 and 152 of the respective levers 142 and 143 to limit the retracted or inoperative positions of said levers. The tension in the springs 172 and 173 of the respective needle valves 157 and 158 will cause a corresponding retraction of said valves, the limit of such retraction being determined by the position of the adjusting screws 155 and 156.

To effect certain other adjustments, and to compensate for slight variations or inaccuracies in carburetor dimensions, certain adjusting mechanisms are additionally employed. One of these includes a slidable mounting for the solenoid so as to vary its position with respect to the connector 137 and enable the position and tension in spring 132 to be adjusted to suitable values. The solenoid 130 is mounted on a frame 174 which has an upper bar 175 and a lower slide loop 176 (see Fig. 17) slidably mounted over the supporting plate 177. Mounted on said plate is the bracket 178 (Fig. 13) carrying the adjusting screw 179 in abutment with said frame 174. Said screw 179 can be adjustably rotated to set the position of frame 174, within suitable limits, thereby determining the required tension in spring tension 132 and its required somewhat loose positioning between the pin 134 and loop 136 of connector 137 when the respective needle valves are in their operative retracted positions.

The said plate 177 contains an arm 180 which rests upon the flange 181 of the carburetor, the nut 182 providing a pivotal connection therefor substantially in the manner of our invention first above described. It is hence apparent that the proper relative positions of the two needle valves 157 and 158 with respect to the respective channels 161 and 162 can be adjusted by a suitable positioning of plate 177.

In the event of slight dimensional variations or inaccuracies in the carburetor body, such as in the relative positions of the bosses 183 and 184 into which the respective guide bushings 159 and 160 are inserted, a compensating adjustment is effected through the upper pivotal plate 185. This plate is pivotally connected through stud 186 to the said bar 175—the shank 187 of the stud extending through a hole in the bar and being in threaded engagement therewith, the enlarged neck 188 of the stud being in rotatable engagement with the aperture 189 in said plate 185. At the forward end of said bar 175 is the aperture 190 in substantial registry with the aperture 191 on the upper plate 185. Extending through both of said apertures is the shank of the bolt 192, said shank being smaller than the said aperture 191, whereby it is movable therein. The bolt 192 is secured in place by the nut 193; and the spring 194 yieldably maintains said plate 185 and bar 175 in engagement. It is further to be noted that said plate 181 carries the framework 148 which supports the said levers 142 and 143 and the associated needle valve assemblies.

The arrangement is such that, after an adjustment of the needle valves 157 and 158 is made by an operative manipulation of the adjusting screws 155 and 156, there is still the possibility of a further adjusting movement of the entire framework 148 by the pivotal movement of plate 185 about the said pivotal screw 186. In other words, provision is made for the longitudinal adjustment of the said needle valves, as well as for the automatic lateral adjustment of the assembly resulting from pressures in a lateral direction.

The applicability of our invention to the dual carburetor construction is such as to enable a single solenoid to operatively actuate both needle valves simultaneously, to effect the closing and opening of the two idling orifices—as well as to effect proper adjustments of both of said valves to meet the specific conditions of the engine and carburetor construction and operation.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

We claim:

1. In a deceleration fuel control device for an internal combustion engine having an intake manifold, a carburetor with a needle valve and electro-mechanical means operatively connected to said needle valve, the combination of an electrical circuit connected to said electro-mechanical means, and an intake manifold-controlled switch, said switch comprising a hollow casing, a tube within said casing and having an apertured portion therein communicating with said manifold and the interior of the casing, a spring loaded diaphragm operatively supported therein, a first contact member, a second contact member carried by said diaphragm and normally maintained thereby in spaced relation to said first contact member, both of said contact members being in said circuit, said diaphragm being movably responsive to pressures in said manifold below a predetermined value, said diaphragm being operatively movable in response to said pressures to bring said second contact member into engagement with said first contact member to close the circuit through said electro-mechanical means and operatively actuate said needle valve.

2. In a deceleration fuel control device, the combination according to claim 1, said tube within said casing carrying said first contact member.

3. In a deceleration fuel control device for an internal combustion engine having an intake manifold, a carburetor with a needle valve and electro-mechanical means operatively connected to said needle valve, the combination of an electrical circuit connected to said electro-mechanical means, and an intake manifold-controlled switch, said switch comprising two engageable contacts in said circuit, a casing communicating with said manifold, a pressure responsive diaphragm within said casing and carrying one of said contacts, said diaphragm being movable between a normal retracted position in which said contacts are out-of-engagement and a deflected position in which said contacts are in engagement, said diaphragm being responsive to pressures below said low speed pressure, whereby said diaphragm will be deflected to bring said contacts into engagement and to close said circuit, an enclosed bleeder tank adjacent said casing, and conduit means communicating between the interiors of said casing and said tank, said conduit means having therein a restricted passageway.

4. In a deceleration fuel control device for an internal combustion engine having a carburetor operatively connected therewith, the combination of a needle valve operatively connected with said carburetor and movable between a closing projected and an open retracted position, a solenoid with a plunger movable between an operative and an inoperative position, a pivotally mounted lever, connecting means between one arm of the lever and said plunger, a needle valve actuator on the other arm of said lever and in alignment with and abuttable with said needle valve, whereby upon an operative actuation of said plunger to its said operative position the said actuator will be caused to move said needle valve directly to its said projected position, spring means normally urging said needle valve to its said retracted position, an electrical circuit connected to said solenoid, and switch means in said circuit.

5. In a deceleration fuel control device, the combination according to claim 4, said connecting means comprising a spring attached to said lever and said plunger, said spring not being under tension when said needle valve and said plunger are in their said retracted positions.

6. In a deceleration fuel control device for an internal combustion engine having a carburetor operatively connected therewith, the combination of a needle valve operatively connected with said carburetor and movable between a closing projected and an open retracted position, a solenoid with a plunger movable between an operative and an inoperative position, a pivotally mounted lever, connecting means between one arm of the lever and said plunger, a needle valve actuator on the other arm of said lever and in alignment with and abuttable with said needle valve, whereby upon an operative actuation of said plunger to its said operative position the said actuator will be caused to move said needle valve directly to its said projected position, spring means normally urging said needle valve to its said retracted position, an electrical circuit connected to said solenoid, and switch means in said circuit, said needle valve actuator being an adjusting screw in threaded engagement with said lever and having its shank in substantial alignment with the shank of said needle valve.

7. In a deceleration fuel control device, the combination according to claim 6, the terminal of said adjusting screw being of rounded configuration, said needle valve having a head portion with a rounded depressed portion therein with which said screw terminal is in abutment.

8. In a deceleration fuel control device, the combination according to claim 6, and a guide bushing with a central passage secured to said carburetor, said needle valve extending through said passage and being in slidable engagement therewith.

9. In a deceleration fuel control device, the combination according to claim 6, said connecting means comprising a spring attached to said lever and said plunger and not being under tension when said needle valve and said plunger are in their said retracted positions, and separate stop means positioned for engagement with said lever and said plunger when the latter is in its said retracted position.

10. In a deceleration fuel control device for an internal combustion engine having a carburetor with two fuel mixture passageways communicating therewith, the combination of two needle valves operatively connected with said carburetor and each being movable between a projected closed position and a retracted open position, a solenoid with a plunger movable between an operative and an inoperative position, two adjacent pivotally mounted levers, connecting means between said plunger and an arm of each of said levers, needle valve actuators on the other arms of said respective levers and abuttable with said respective needle valves, whereby upon operative movement of said plunger to its said operative position the said actuators will be caused to move said respective needle valves to their respective operative positions, spring means normally urging said needle valves to their respective retracted positions, an electrical circuit connected to said solenoid and switch means in said circuit.

11. In a deceleration fuel control device, the combination according to claim 10, said levers having two adjacent overlapping arms, said connecting means comprising a looped member with two legs in engagement with said two overlapping arms, and a spring attached to said plunger and said looped member.

12. In a deceleration fuel control device, the combination according to claim 10, said levers having two adjacent overlapping arms, said connecting means comprising a looped member with two legs in engagement with said two overlapping arms, and a spring attached to said plunger and said looped member, and a support for said solenoid, said solenoid being adjustably movable along said support.

13. In a deceleration fuel control device, the combination according to claim 10, a support for said solenoid, said support having an upper bar, a plate pivotally secured to said bar and in engagement therewith, said plate supporting said needle valve and lever assemblies, said plate being pivotally movable relative to said bar in a direction substantially transverse to the longitudinal extent of said needle valves, and yieldable means holding said plate and bar in frictional engagement.

14. In a deceleration fuel control device, the combination according to claim 10, said levers having two adjacent overlapping arms, said connecting means comprising a looped member with two legs in engagement with said two overlapping arms, and a spring attached to said plunger and said looped member, and stop means positioned for engagement with said overlapping arms of said levers when said plunger is in its said retracted position.

References Cited in the file of this patent

UNITED STATES PATENTS

| | | |
|---|---|---|
| 2,164,694 | Betz et al. | July 4, 1939 |
| 2,203,613 | Cyr | June 4, 1940 |
| 2,386,340 | Olson | Oct. 9, 1945 |
| 2,566,704 | Leibing | Sept. 4, 1951 |
| 2,662,946 | Schweiss | Dec. 15, 1953 |
| 2,698,159 | Crum | Dec. 28, 1954 |

FOREIGN PATENTS

| | | |
|---|---|---|
| 800,897 | France | May 11, 1936 |
| 963,903 | France | Jan. 18, 1950 |
| 466,164 | Great Britain | May 18, 1937 |